(12) United States Patent
Wu et al.

(10) Patent No.: US 8,868,339 B2
(45) Date of Patent: Oct. 21, 2014

(54) SYSTEM AND METHOD FOR DYNAMIC ROUTE GUIDANCE

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 25 days.

(21) Appl. No.: 13/434,156

(22) Filed: Mar. 29, 2012

(65) Prior Publication Data
US 2013/0261960 A1 Oct. 3, 2013

(51) Int. Cl.
*G01C 21/00* (2006.01)
*G08G 1/123* (2006.01)

(52) U.S. Cl.
USPC ..................... 701/465; 340/995.19

(58) Field of Classification Search
CPC ............... G01C 21/26; G01C 21/3407; G01C 21/3484; G01C 21/3617; G01C 21/3679; G01C 21/3691; G07C 5/0841; B60L 2240/622; B60L 2240/70; B60L 2250/16; B60L 2250/20; G08G 1/096811; G08G 1/096844; G08G 1/0968
USPC ........ 701/400–541; 340/988–996; 705/34, 13
See application file for complete search history.

(56) References Cited

U.S. PATENT DOCUMENTS

| | | | |
|---|---|---|---|
| 2001/0025251 A1* | 9/2001 | Konishi et al. | 705/13 |
| 2006/0190167 A1 | 8/2006 | Inukai | |
| 2008/0262717 A1* | 10/2008 | Ettinger | 701/206 |
| 2009/0295599 A1* | 12/2009 | Coffee et al. | 340/928 |
| 2012/0271544 A1* | 10/2012 | Hein et al. | 701/423 |

FOREIGN PATENT DOCUMENTS

JP 2009-210508 * 9/2009

* cited by examiner

*Primary Examiner* — Muhammad Shafi
(74) *Attorney, Agent, or Firm* — Kermit D. Lopez; Luis M. Ortiz; Ortiz & Lopez, PLLC

(57) ABSTRACT

A system and method for informing commuters of real-time time of arrival and cost information with respect to one or more routes prior to commencement of a trip. Reserved lane information (e.g., toll charge, traffic speeds in the reserved and general lanes, etc.) can be integrated with a data feed provided to, for example, navigation enabled devices such as in-car guidance systems or mobile phones. Time of arrival information with respect to the destination can be provided based on wireless data indicative of traffic conditions and highway speed limit information. Additionally, real-time toll charges can be provided to the commuter for multiple routes.

15 Claims, 4 Drawing Sheets

SYSTEM AND METHOD FOR DYNAMIC ROUTE GUIDANCE

TECHNICAL FIELD

The disclosed embodiments generally relate to systems and methods for optimizing usage of toll lanes. The disclosed embodiments also generally relate to a system and method of informing commuters of the time savings and cost for different routes to a final destination prior to commencing a trip.

BACKGROUND OF THE INVENTION

Reserved traffic lanes are highway lanes, which have been reserved for the use of a selected sub-set of commuters. The selected sub-set of commuters could be, for example, emergency vehicles, buses, car-pools or other high-occupancy vehicles (HOVs). One category in this sub-set consists of vehicles which have volunteered to pay a special toll surcharge to use the reserved traffic lanes. This category will continue to grow in popularity as toll operators seek to increase their revenue.

The revenue for the toll road operators is greatest when the reserved lanes are running at close to maximum capacity. However, at higher levels of usage, congestion of the reserved lanes can result in commuter dissatisfaction and lead to reduced usage. One option to balance usage and revenue is to control the level of usage, to some extent, by adjusting the toll charges dynamically over time according to said level of usage. In order to optimize the usage, it is necessary for commuters to properly understand the dynamic toll charges and the benefit they provide in terms of reduced congestion at any given time. The current state of the art does not adequately address this.

Electronic signs which provide information to the commuter, such as traffic speeds in the reserved and general lanes, toll charges, and time saved by using the reserved lanes, are one means by which to inform the commuter. The benefits of this type of system are limited because the time savings can only be provided on a limited time scale and only when the commuter is already physically present at the toll lane entrance. Moreover, a commuter is forced to make a quick decision on whether or not to use a given toll lane in the brief period that the sign is visible and he may need to do this repeatedly at several toll lanes before reaching his destination.

Therefore, a need exists for a system and method to inform commuters of the time saving and cost for a number of different routes to a final destination before commencement of a trip to allow for informed trip planning.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved system and method for dynamic route guidance.

It is, therefore, another aspect of the disclosed embodiments to provide a system and method for providing real-time toll charges for multiple routes to a final destination.

In order to provide an improved system and method for informing commuters of real-time time of arrival and cost for a plurality of routes prior to commencement of a trip, providing updated information during the trip, and allowing commuters to alter the route in real-time based on updated information, the disclosed embodiments present a method and system of integrating reserved lane information (toll charge, traffic speeds in the reserved and general lanes, etc.) with a data feed provided to navigation enabled devices, such as in-car GPS guidance systems or mobile phones.

A destination location is received by the navigation enabled device and an origin location is determined. Multiple routes between the destination location and origin location are then determined. Supplementary information may be received for each of the segments within each of the routes. Supplementary information may include real-time toll charge information, traffic speeds, and/or other traffic conditions. Then a summary including the corresponding total toll charge of each route and estimated time of arrival can be displayed for selection. A user may then select the desired route and the navigation enabled device can provide guidance to the destination location based on the selected route using turn-by-turn directions or otherwise.

A number of embodiments, preferred and alternative are disclosed herein. For example, in one embodiment, a computer implemented method for performing dynamic route guidance can be implemented. Such a method can include, for example, the steps of determining a plurality of routes from an origin location to a destination location wherein the plurality of routes comprise a plurality of segments, receiving real-time toll charge information with respect to each segment among the plurality of segments, and displaying the plurality of routes for selection, wherein a total toll charge is displayed with respect to each route among the plurality of routes.

In another embodiment, the origin location can be defined as the current location of the device. In still another embodiment, the current location is determined by satellite-based global positioning, mobile phone triangulation, and/or inertial navigation. In another embodiment, a step can be provided to receive real time traffic information. In yet another embodiment, a step can be provided to display an estimated time of arrival for each route among the plurality of routes. In still another embodiment, a step can be provided to receive preference parameters. In another embodiment, a step can be provided to select and display the plurality of routes based on the received preference parameters.

In another alternate embodiment, a processor-readable medium storing code representing instructions to cause a process to perform dynamic route guidance can be implemented. Such a processor readable medium can store code to cause, for example, the steps of determining a plurality of routes from an origin location to a destination location wherein the plurality of routes comprise a plurality of segments, receiving real-time toll charge information with respect to each segment among the plurality of segments, and displaying the plurality of routes for selection, wherein a total toll charge is displayed with respect to each route among the plurality of routes.

In a further another embodiment, the origin location is the current location of the device. In still another embodiment, the code comprises code to determine the current location based on data from satellite-based global positioning, mobile phone triangulation, inertial navigation, and/or user input. In another embodiment, the code comprises code to receive real time traffic information. In yet another embodiment, the code comprises code to display an estimated time of arrival for each route among the plurality of routes. In still another embodiment, the code comprises code to receive preference parameters. In another embodiment, the code comprises code to select and display the plurality of routes based on the received preference parameters.

In another alternate embodiment, a system for dynamic route guidance can be implemented. Such a system can comprise, for example, a processor, a data bus coupled to said processor, and a computer-usable medium embodying computer code comprising instructions executable by the processor and configured for: determining a plurality of routes from an origin location to a destination location wherein the plurality of routes comprise a plurality of segments, receiving real-time to charge information with respect to each segment among the plurality of segments, and displaying the plurality of routes for selection, wherein a total to charge is displayed with respect to each route among the plurality of routes.

In a further another embodiment, the system further comprises at least one of: a navigation device, a mobile phone, and a portable computer. In yet another embodiment, the origin location comprises the current location of the device. In still another embodiment, the instructions are further configured for receiving real time traffic information. In yet another embodiment, the instructions are further configured for displaying an estimated time of arrival for each route among the plurality of routes. In still another embodiment, the instructions are further configured for receiving preference parameters. In another embodiment, the instructions are further configured for displaying the plurality of routes based on the received preference parameters.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Unnecessary detail of known functions and operations may be omitted from the current description so as not to obscure the present invention. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
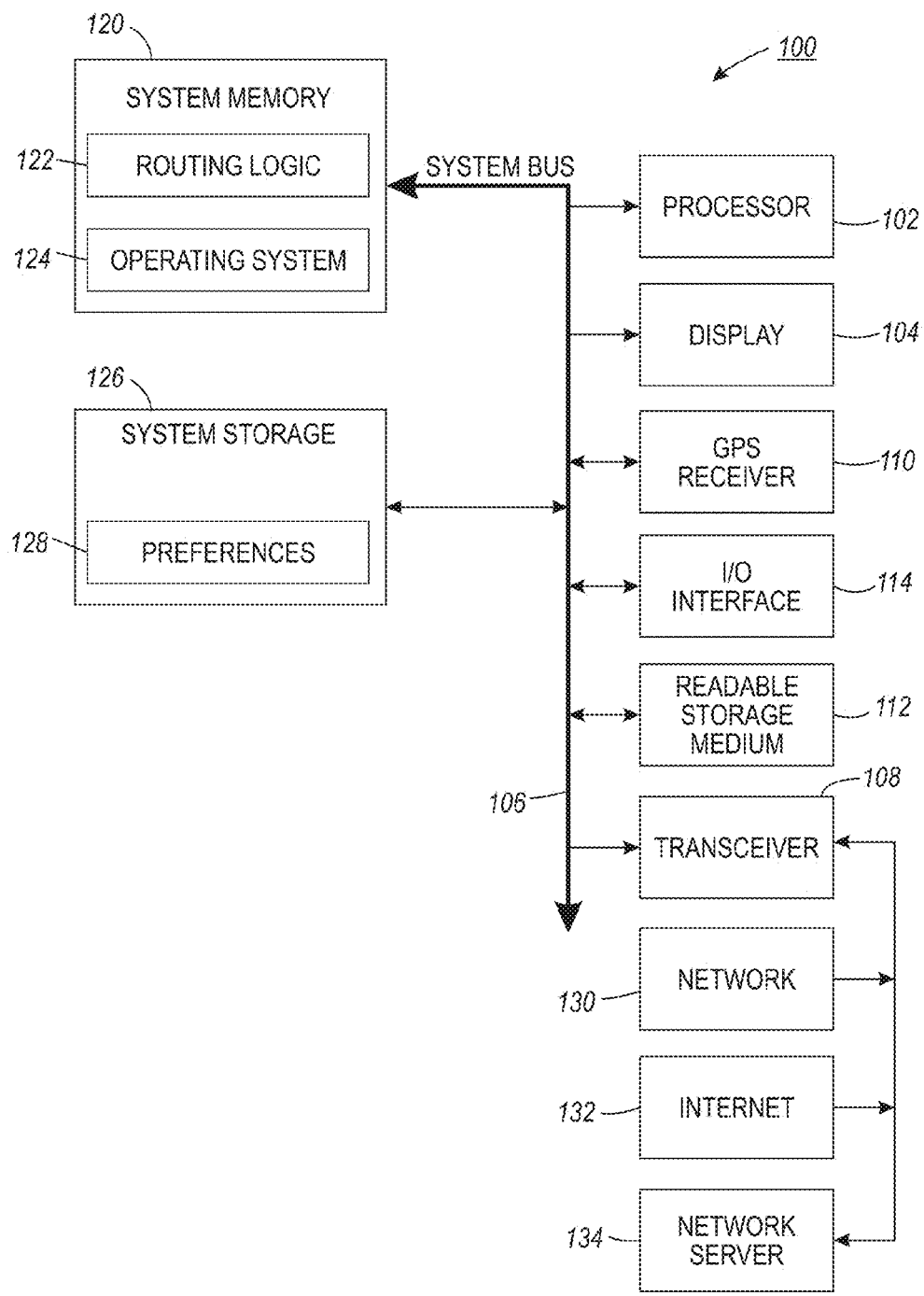
FIG. 1 illustrates a block diagram of a Global Positioning Satellite (GPS) enabled device in which the present invention may be implemented, in accordance with the disclosed embodiments.

FIG. 1 shows a block diagram of a Global Positioning Satellite (GPS) enabled device 100 in which the present invention may be implemented. Navigation enabled device 100 includes a processor 102 and a display 104 that is coupled to a system bus 106. Display 104 may be a touch-screen display or a display configured to receive input via human touch or a pointing device (e.g., stylus). A transceiver 108, connected to system bus 106, enables the navigation enabled device 100 to connect to network 130, an internet 132, and a network server 134. Navigation enabled device 100 may also receive satellite transmissions via a GPS receiver 110. A system bus 106 also affords communication with a hardware-based readable storage medium 112 (e.g., Compact Disk-Read Only Memory (CD-ROM), flash memory, hard disk, etc.). Input/Output (I/O) Interface 114, also connected to system bus 106, permits user interaction with GPS device 100 such as data entry via keyboard or stylus.

The navigation enabled device 100 also comprises system memory 120, which is connected to system bus 106. As shown, system memory 120 also comprises routing logic 122 and operating system 124. Routing logic 122 includes code for implementing the processes described in FIGS. 2-3. Navigation enabled device 100 also comprises a system storage 126, which is connected to system bus 106. System storage 126 may contain preference parameters 128, which may include route history information and user defined preferences for requesting a route selection list.

The embodiments described herein can be implemented in the context of the operating system 124 on the navigation enabled device 100 and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular data type.

Software modules generally include instruction media storable within a memory location of a data-processing system and are typically composed of two parts. First, a software module may list the constants, data types, variable, routines and the like that can be accessed by other modules or routines. Second, a software module can be configured as an implementation, which can be private (i.e., accessible perhaps only to the module), and contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media including transmission media and/or recordable media.

In this manner, the commuter can know the total to charge to his final destination and the total time saved by taking into account all toll segments on the way to the destination, not just the local segment. Moreover, the navigation application may accept preference parameters specified by the commuter or selected from a menu. Preference parameters may include time saved (in minutes or as a fraction of travel time), toll charges, and/or value (e.g., in minutes per dollar). Based on these parameters, the application may select the optimum path to destination utilizing certain toll segments and avoiding others. Alternatively, the user may be provided with several routes to choose from, said routes (and optionally a default route) being selected from all possible routes based on said preference parameters. Furthermore, the optimum path may be updated automatically based on these selected preference parameters or confirmed with users in real-time based on updated traffic information. In one embodiment, this step will be executed only when significant changes of traffic information are detected compared to the last update of the optimal path.

Figure 2:
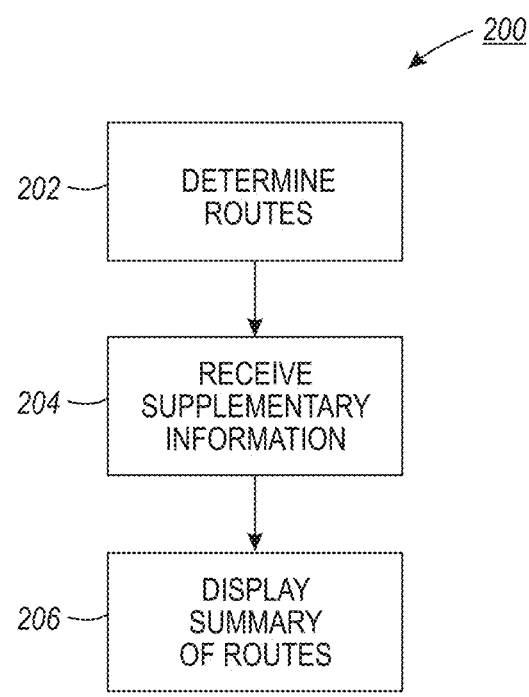
FIG. 2 illustrates a high level flow chart of operations depicting logical operational steps of a method for dynamic route guidance, in accordance with the disclosed embodiments.

FIG. 2 illustrates a high level flow chart of operations depicting logical operational steps of a method 200 for dynamic route guidance. Multiple routes between a destination location and an origin location are determined, as shown in block 202. The routes may include a number of different segments for which traffic and toll information may differ. Supplementary information may be received for each of the segments within each of the routes, as shown in block 204. Supplementary information may include real-time toll charge information, traffic speeds, and/or other traffic conditions. Then, as depicted in block 206, a summary of each route can be displayed, along with the corresponding total toll charge and estimated time of arrival for that route. A user may then select the desired route and the navigation enabled device can provide guidance to the destination location based on the selected route and optionally update the guidance real-time when toll-charge and/or traffic information vary significantly.

Figure 3:
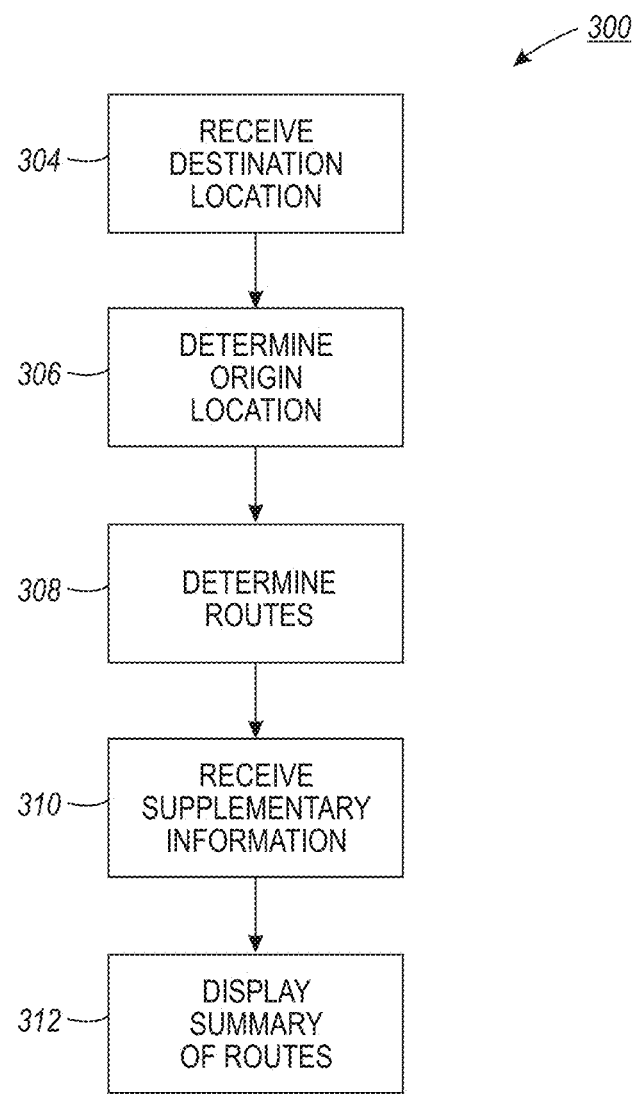
FIG. 3 illustrates a flow chart of operations depicting logical operational steps of an alternate embodiment of a method for dynamic route guidance.

FIG. 3 illustrates a flow chart of operations depicting logical operational steps of an alternate embodiment of a method 300 for dynamic route guidance. A destination location is received by the navigation enabled device, as shown in block 304. The destination location may be provided directly by a user or by another module being implemented on the navigation enabled device 100, such as a mapping application. As depicted in block 306, an origin location is determined. The origin location can be the current physical location of navigation enabled device 100 as determined by satellite-based global positioning, mobile phone signal triangulation or inertial navigation. The origin location may also be inputted by a user or other module.

Multiple routes between the destination location and origin location are then determined, as shown in block 308. The routes may include a number of different segments for which traffic and toll information may differ. Supplementary information may be received for each of the segments within each of the routes, as shown in block 310. Supplementary information may include real-time toll charge information, traffic speeds, and/or other traffic conditions. This information can be provided by any of the network 130, internet 132, network server 134 or satellite transmissions as discussed in FIG. 1.

Then, as depicted in block 312, a summary of each route can be displayed, along with the corresponding total toll charge and estimated time of arrival for that route. A user may then select the desired route and the navigation enabled device can provide guidance to the destination location based on the selected route using turn-by-turn directions or otherwise. Optionally, the navigation enabled device may provide updates of the guidance real-time when toll-charge and/or traffic information vary significantly.

Figure 4:
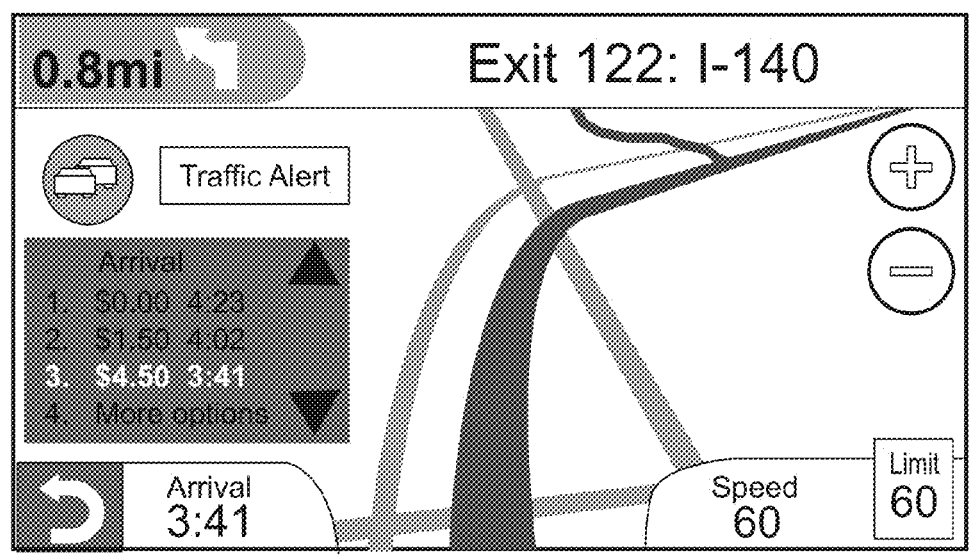
FIG. 4 is a schematic representation of a navigation enabled device display, in accordance with the disclosed embodiments.

A schematic representation of a navigation enabled device display is shown in FIG. 4. The display depicts examples of multiple routes presented for selection, including corresponding toll charges and time of arrival estimates. The user can choose one of the route options to commence guidance by the navigation enabled device 100. The navigation enabled device 100 may also offer a default option from among those available based on preference parameters previously selected by the commuter or learned by the device from earlier user choices. For exemplary purposes, the default option displayed in FIG. 4 is #3, but the user is free to select one of the other options from the display. Note that FIG. 4 is presented only as an illustrative example of a graphical user interface of the navigation enabled device and numerous variations of such an interface are possible. Preferably the option display is invoked manually or automatically, for example, at the start of the trip, or when significant changes have occurred in the real-time toll charge and/or traffic information along these potential routes.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for dynamic route guidance, said system comprising:
   a processor;
   a data bus coupled to said processor; and
   a computer-usable medium embodying computer code, said computer-usable medium being coupled to said data bus, said computer program code comprising instructions executable by said processor to:
   determine a plurality of routes from an origin location to a destination location prior to commencing a trip between said origin location and said destination location, said plurality of routes comprising a plurality of segments;
   receive real-time toll charge information with respect to each segment among said plurality of segments prior to commencement of said trip;
   receive user selected preferences, wherein said selected preferences comprise time saved, toll charges or minutes saved per unit of money;
   receive preferences learned by said system from previously made route selections;
   display said plurality of routes for selection prior to commencement of said trip, wherein a total toll charge and an estimated time of arrival is displayed with respect to each route among said plurality of routes; and
   display a default route based on said selected preferences and said preferences learned by said system.

2. The system of claim 1 further comprising at least one of: a navigation device, a mobile phone, and a portable computer.

3. The system of claim 1 wherein said origin location comprises a current location.

4. The system of claim 3 wherein said instructions are further configured to determine said current location by at least one of: satellite-based global positioning, mobile phone triangulation, and inertial navigation.

5. The system of claim 4 wherein said instructions are further configured to receive real-time traffic information and dynamically updating, upon commencement of said trip, said plurality of routes for selection based on said real-time traffic information.

6. The system of claim 1 wherein said instructions are further configured to display said plurality of routes based on said preference parameters.

7. A non-transitory processor-readable medium storing code representing instructions to cause a process to perform dynamic route guidance, said code comprising code to:
   determine a plurality of routes from an origin location to a destination location prior to commencing a trip between said origin location and said destination location, said plurality of routes comprising a plurality of segments;
   receive real-time toll charge information with respect to each segment among said plurality of segments prior to commencement of said trip;
   receive user selected preferences, wherein said selected preferences comprise time saved, toll charges or minutes saved per unit of money;
   receive preferences learned by said system from previously made route selections;
   display said plurality of routes for selection prior to commencement of said trip, wherein a total toll charge and an estimated time of arrival is displayed with respect to each route among said plurality of routes; and
   display a default route based on said selected preferences and said preferences learned by the system.

8. The non-transitory processor-readable medium of claim 7 wherein said origin location comprises a current location.

9. The non-transitory processor-readable medium of claim 8 wherein said code further comprises code to determine said current location by at least one of: satellite-based global positioning, mobile phone triangulation, and inertial navigation.

10. The non-transitory processor-readable medium of claim 9 wherein said code further comprises code to receive real-time traffic information and dynamically update, upon commencement of said trip, said plurality of routes for selection based on said real-time traffic information.

11. The non-transitory processor-readable medium of claim 7 wherein said code further comprises code to display said plurality of routes based on said preference parameters.

12. A computer-implemented method for dynamic route guidance, said method comprising:
   determining by a processor, by executing a program instruction a plurality of routes from an origin location to a destination location prior to commencing a trip between said origin location and said destination location, wherein said plurality of routes comprises a plurality of segments;
   receiving real-time toll charge information for each segment among said plurality of segments prior to commencement of said trip by executing a program instruction in a computer system;
   receiving user selected preferences, wherein said selected preferences comprise time saved, toll charges or minutes saved per unit of money by executing a program instruction in a computer system;
   receiving preferences learned by said system from previously made route selections by executing a program instruction in a computer system;
   displaying said plurality of routes for selection prior to commencement of said trip, wherein a total toll charge and an estimated time of arrival is displayed for each route among said plurality of routes by executing a program instruction in a computer system; and
   displaying a default route based on said selected preferences and said preferences learned by the system by executing a program instruction in a computer system.

13. The method of claim 12 further comprising configuring said origin location comprising a current location.

14. The method of claim 13 further comprising determining said current location by at least one of: satellite-based global positioning, mobile phone triangulation, and inertial navigation.

15. The method of claim 14 further comprising receiving real-time traffic information and dynamically updating, upon commencement of said trip, said plurality of routes for selection based on said real-time traffic information.

* * * * *